United States Patent
Sorsby

(10) Patent No.: US 12,231,283 B1
(45) Date of Patent: Feb. 18, 2025

(54) SYSTEM AND METHOD FOR USING FPGA LOOK-UP TABLE AS QUADRATURE DIGITAL CORRELATOR

(71) Applicant: Rockwell Collins, Inc., Cedar Rapids, IA (US)

(72) Inventor: William B. Sorsby, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 9 days.

(21) Appl. No.: 18/231,458

(22) Filed: Aug. 8, 2023

(51) Int. Cl.
*H04L 27/38* (2006.01)

(52) U.S. Cl.
CPC .................................. *H04L 27/389* (2013.01)

(58) Field of Classification Search
CPC .................................................... H04L 27/389
See application file for complete search history.

(56) References Cited

U.S. PATENT DOCUMENTS

| | | | |
|---|---|---|---|
| 5,841,816 A | 11/1998 | Dent et al. | |
| 7,302,460 B1 | 11/2007 | Langhammer | |
| 9,264,282 B2 | 2/2016 | Cui et al. | |
| 2008/0109503 A1 | 5/2008 | Gross et al. | |
| 2013/0308687 A1* | 11/2013 | Joseph | G01S 19/30 375/150 |
| 2020/0124719 A1* | 4/2020 | Noujeim | G05D 1/0088 |
| 2024/0297673 A1* | 9/2024 | Biswas | H04B 1/1027 |

FOREIGN PATENT DOCUMENTS

| | | |
|---|---|---|
| CA | 2317901 C | 4/2011 |
| CN | 103543441 B | 8/2015 |
| EP | 0474491 A2 | 3/1992 |
| WO | 2022225819 A1 | 10/2022 |

* cited by examiner

*Primary Examiner* — Janice N Tieu
(74) *Attorney, Agent, or Firm* — Suiter Swantz IP

(57) ABSTRACT

A system and method for correlating a received signal is disclosed. The system may include an antenna configured to receive the received signal. The system may also include a controller. The controller may include a field programmable gate array (FPGA) including a plurality of look-up tables (LUTs). The controller may also include a plurality of registers for storing and manipulating data. The plurality of registers may be coupled to the plurality of LUTs. The plurality of registers may include a known reference register, a secondary reference register, an in-phase register, and a quadrature register. Each LUT may be configured to receive Boolean inputs from the known reference register, the secondary reference register, the in-phase register, and the quadrature register and to output correlation results based on the Boolean inputs.

20 Claims, 5 Drawing Sheets

BOOLEAN CORRELATOR LOOK-UP TABLE (LUT)

| INPUT | | | | OUTPUT | |
|---|---|---|---|---|---|
| KS | AS | I | Q | 0° | 90° |
| 1 | 1 | 1 | 1 | 0 | 1 |
| 1 | 1 | 1 | 0 | 1 | 1 |
| 1 | 1 | 0 | 1 | 0 | 0 |
| 1 | 1 | 0 | 0 | 1 | 0 |
| 1 | 0 | 1 | 1 | 1 | 1 |
| 1 | 0 | 1 | 0 | 1 | 0 |
| 1 | 0 | 0 | 1 | 0 | 1 |
| 0 | 1 | 1 | 0 | 0 | 0 |
| 0 | 1 | 0 | 1 | 1 | 0 |
| 0 | 1 | 0 | 0 | 1 | 0 |
| 0 | 0 | 1 | 1 | 0 | 1 |
| 0 | 0 | 1 | 0 | 0 | 1 |
| 0 | 0 | 0 | 1 | 1 | 0 |
| 0 | 0 | 0 | 0 | 1 | 1 |

FIG. 3

SYSTEM AND METHOD FOR USING FPGA LOOK-UP TABLE AS QUADRATURE DIGITAL CORRELATOR

TECHNICAL FIELD

The present disclosure generally relates to signal processing, and more particularly, to a system and method for correlating a received signal using a field programmable gate array (FPGA) with look-up tables (LUTs) as elemental quadrature correlators.

BACKGROUND

Signal correlation plays a vital role in many modern electronic systems, particularly in wireless communication systems such as radar systems and telecommunication networks. Correlation is an operation that may measure the similarities between two signals. In the context of a wireless communication system, correlation can be used in various ways, such as in detecting known signals within a noisy background, or in aligning two signals in time.

Field Programmable Gate Arrays (FPGAs) are semiconductor devices that are used in various kinds of electronic systems owing to their programmability. They can be reprogrammed to desired application or functionality requirements after manufacturing. This feature distinguishes them from Application Specific Integrated Circuits (ASICs), which are custom manufactured for specific design tasks. Because of their flexibility, FPGAs are used in many applications including signal processing, software-defined radios, and machine learning. One of the common elements in FPGAs is the look-up table (LUT), which can be programmed to perform complex digital computation tasks efficiently.

Correlating a received signal having an arbitrary rotation can be challenging. Traditional methods of signal correlation often involve complex and resource-intensive processes. These processes typically require significant computational resources and sometimes lead to slower processing times.

There exists a need for a system and method that can efficiently perform signal correlation, especially for received signals with an arbitrary rotation that addresses various issues of existing systems.

SUMMARY

A system and method for correlating a received signal is disclosed in accordance with one or more illustrative embodiments of the present disclosure. In one illustrative embodiment, the system may include an antenna configured to receive the received signal. In another illustrative embodiment, the system may include a controller. In another illustrative embodiment, the controller may include a field programmable gate array (FPGA) including a plurality of look-up tables (LUTs). In another illustrative embodiment, the controller may also include a plurality of registers for storing and manipulating data. In another illustrative embodiment, the plurality of registers may be coupled to the plurality of LUTs. In another illustrative embodiment, the plurality of registers may include a known reference register, a secondary reference register, an in-phase register, and a quadrature register. In another illustrative embodiment, each LUT may be configured to receive Boolean inputs from the known reference register, the secondary reference register, the in-phase register, and the quadrature register and to output correlation results based on the Boolean inputs.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 3 is a table of Boolean correlator LUT input and output values, in accordance with one or more embodiments of the present disclosure.

DETAILED DESCRIPTION

Figure 1A:
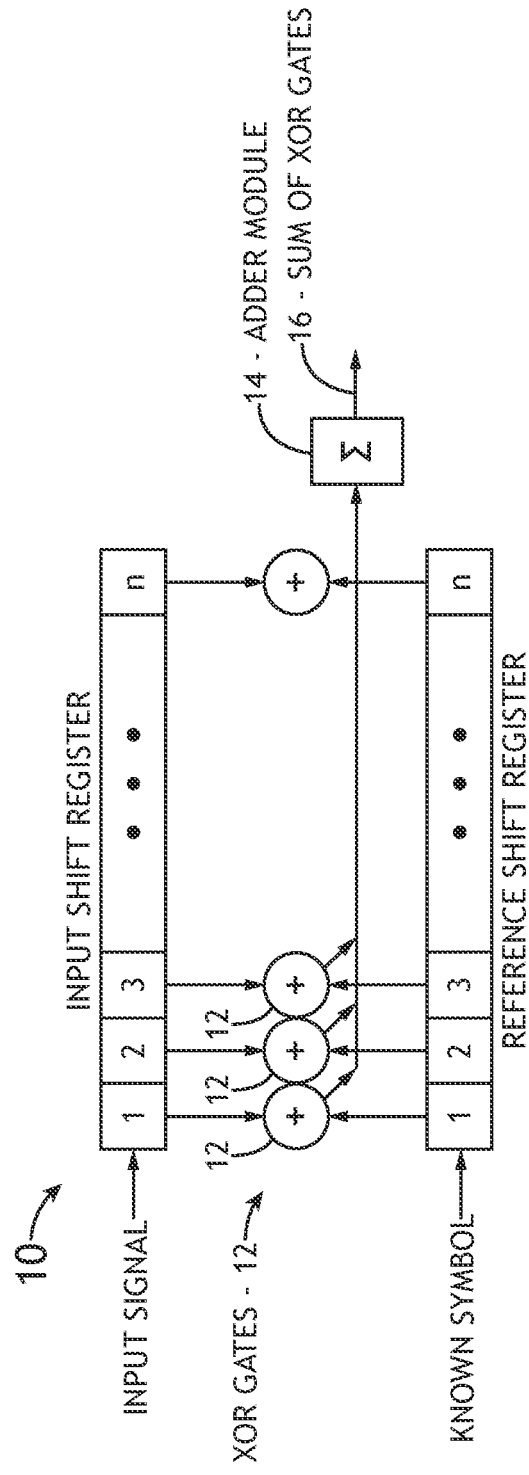
FIG. 1A is a conceptual block diagram of a single axis binary correlator.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

The ensuing detailed description provides an innovative approach to signal correlation that overcomes many limitations found in traditional methodologies. This disclosure presents a sophisticated yet streamlined system that harnesses the power of field programmable gate arrays (FPGAs) to enhance and expedite signal correlation in a highly efficient manner. This novel system leverages FPGA look-up tables (LUTs) as elemental quadrature correlators with relatively small amount of Boolean inputs and outputs, symbolizing a breakthrough in correlating received signals, particularly those with arbitrary rotations.

The techniques and architectures presented herein mark a significant departure from longstanding methods, which often rely on complex and resource-intensive circuitry for correlating an arbitrarily rotated signal. Instead, the disclosed system utilizes a single FPGA LUT to fulfill such an elemental correlation, magnifying the efficiency and speed of the process. This unique approach simplifies the overall computational load while simultaneously improving the speed at which correlations can be executed.

Broadly speaking, embodiments of the inventive concepts disclosed herein are directed to a system and method for correlating a received signal using field programmable gate array (FPGA) look-up tables (LUTs) as elemental quadrature correlators. For example, rather than using relatively complex circuitry such as that shown in FIG. 1B for correlating an arbitrarily rotated (i.e., unknown rotation) signal, it is contemplated herein that a single FPGA LUT may be used to accomplish such an elemental correlation, at least for signals where a symbol is binary but positioned in quadrature, such that it is not necessarily required for the receiver's IQ baseband signal to retain amplitude.

Correlation and correlators are often the Achilles heel in digital communications systems. Compromises to various aspects of system performance are often needed on account of the correlator, such as power consumption, hardware resources, software resources, system sensitivity and system range. Typical correlation solutions include using Fast-Fourier Transforms (FFT) or developing a custom Application Specific Integrated Circuit (ASIC), but these approaches both have significant drawbacks and limitations. While FFTs offer some efficiency advantages, FFTs are complex constructs and trade off speed for power consumption. The drawbacks of an ASIC implementation are typically high cost and lack of flexibility if changes are needed after initial ASIC development.

Embodiments herein may disclose how a Look-Up Table (LUT)—a construct in FPGA fabric—can serve as a quadrature correlator. In embodiments, FPGAs with hundreds of thousands or even millions of LUTs may be used. As a result, embodiments herein may inexpensively construct very large digital correlators thousands (e.g., 2000 or more) chips long. Equally important, such correlators can run at the full speed of the FPGA fabric while consuming only miserly amounts of power.

Embodiments crafting an elemental high-speed quadrature correlator using an FPGA's LUTs may require no more FPGA circuitry than an Exclusive-Or (XOR) gate required for a single axis correlator. When compared against conventional FPGA FFT designs, the implementation disclosed herein may use much less power—orders of magnitude less—while providing speeds not attainable with comparably sized FFT-based correlator implementations. Compared with ASIC quadrature correlator implementations, embodiments herein may be much less costly to implement, while offering adaptability not achievable with ASICs.

LUTs in FPGAs are fundamental elements that hold predefined outputs for a set of given inputs. In embodiments, the LUT may be configured/programmed, e.g., through a Hardware Description Language (HDL) such as VHDL or Verilog, to describe the desired logic function, which may be transformed by synthesis tools into a specific configuration for the FPGA's LUTs. A LUT in an FPGA may, in a sense, be considered as a small, predefined memory where each address corresponds to a specific combination of input values, and the content at each address is the result of the logic function for that specific combination. The configuration process programs the values into the LUT, mapping each potential set of input values to its corresponding output. For instance, a 4-input LUT would have 2^4 (or 16) possible inputs. For each of these 16 combinations of inputs, the LUT holds the relevant output(s). Thus, the control of the output values of an FPGA's LUTs may be determined (e.g., determined by a user) during the FPGA programming phase. The user-defined logic function configures the LUT to generate the appropriate output for each given set of inputs. This flexibility allows FPGAs to implement complex digital circuits, with LUTs serving as their basic building blocks.

For example, a nonlimiting example method for programming a LUT using a Hardware Description Language (HDL) may include one or more steps such as, but not necessarily limited to: defining a set of specific input values (e.g., Boolean inputs) and a corresponding set of particular output values (e.g., correlation outputs) for the LUT; writing a Hardware Description Language (HDL) script that instantiates a LUT with the defined set of specific input values and the corresponding set of particular output values; synthesizing the HDL script using an FPGA development environment to generate a configuration file for the FPGA, the file containing the configuration of the LUT with the defined set of specific input values and the corresponding set of particular output values; loading the configuration file onto the FPGA to program the LUT with the defined set of specific input values and the corresponding set of particular output values; applying the specific input values to the programmed LUT; and verifying that the LUT outputs the particular output values that correspond to the applied specific input values, thus confirming successful programming of the LUT.

FIG. 1A illustrates a conceptual block diagram of a single axis binary correlator 10. This may be a relatively simple and basic correlator useable for signals with a single axis. The single axis binary correlator 10 may be configured to match (i.e., correlate) a known reference symbol sequence (i.e., known symbols of a reference shift register) to an input signal stored on an input shift register. The single axis binary correlator 10 may include XOR gates 12 configured to receive values from each register, and a single axis adder module 14 configured to determine an output 16 that comprises a summation of the outputs of the XOR gates 12. When the input signal matches the known symbols, then the XOR output sum 16 goes high (e.g., above a threshold), which indicates a match, thus allowing a signal detection to be declared. The single axis binary correlator 10 may be useful for signals which are binary, but not necessarily useful for signals in quadrature. However, correlating signals in quadrature may be needed in many modern communication receiver systems.

For signals in quadrature, (e.g., such as Minimum Shift Keying (MSK), Gaussian Minimum Shift Keying (GMSK) or Offset Quadrature Phase-Shift Keying (OQPSK) signals), the known symbol may need to be searched for in both the in-phase (I) and quadrature (Q) axes, and orientation relative to the I and Q axes may need to be determined. The orientation of an incoming received signal is often unknown, as channel delay is usually sufficient to rotate the incoming signal orientation anywhere within the four possible quadrants (i.e., 360-degree span). Accomplishing correlation in the presence of arbitrary rotation may typically require more circuit complexity than seen in FIG. 1A. An example of functionality which can replace the XOR gate for such a correlator of arbitrary signal rotation in quadrature is offered in the following FIG. 1B.

Figure 1B:
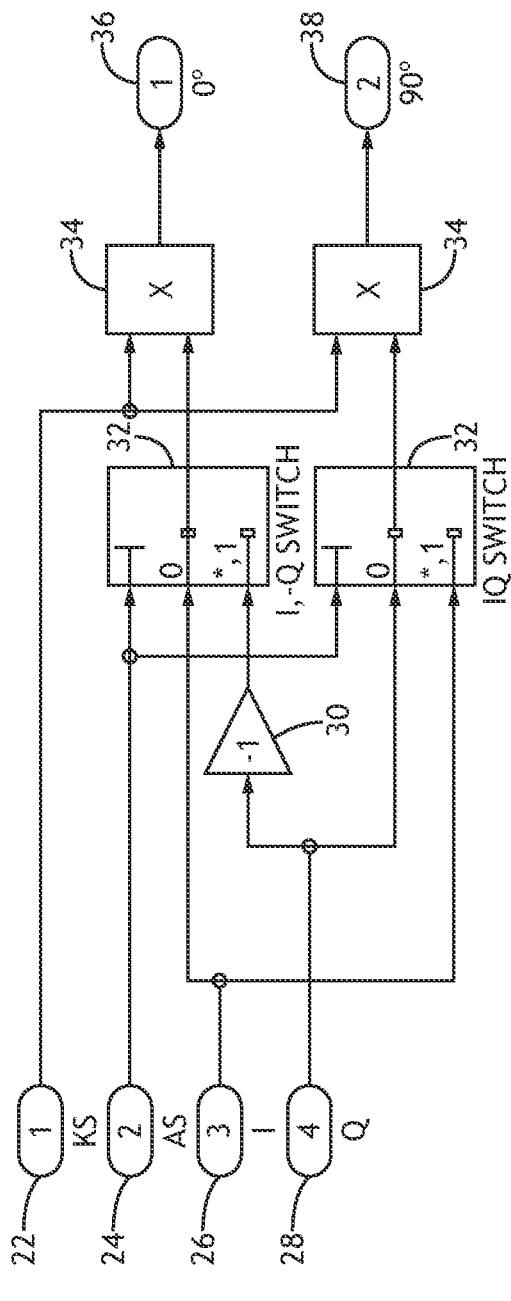
FIG. 1B is a conceptual block diagram of an elemental analog correlator for arbitrary signal rotation.

FIG. 1B illustrates a conceptual block diagram of an elemental analog correlator 20 for arbitrary signal rotation.

The elemental analog correlator 20 may be configured to receive as input a binary known symbol (KS) 22, a binary axis select (AS) 24, a continuously varying I input of a received signal, and a continuously varying Q input of the received signal. The elemental analog correlator 20 may be configured to output two values, a first value 36 and a second value 38. The first value 36 may be configured to reach a peak value magnitude when the input aligns with 0-degree and/or 180-degree rotation. The second value 38 may be configured to reach a peak value magnitude when the input aligns with 90-degree and/or 270-degree rotation. The circuit may include an inverting component 30, an IQ switch 32, an I(−Q) switch 32, and two additional components 34. As shown, FIG. 1B, which is only a single elemental correlator 20, is more complex than each individual correlator 12 shown in FIG. 1A.

Figure 2:
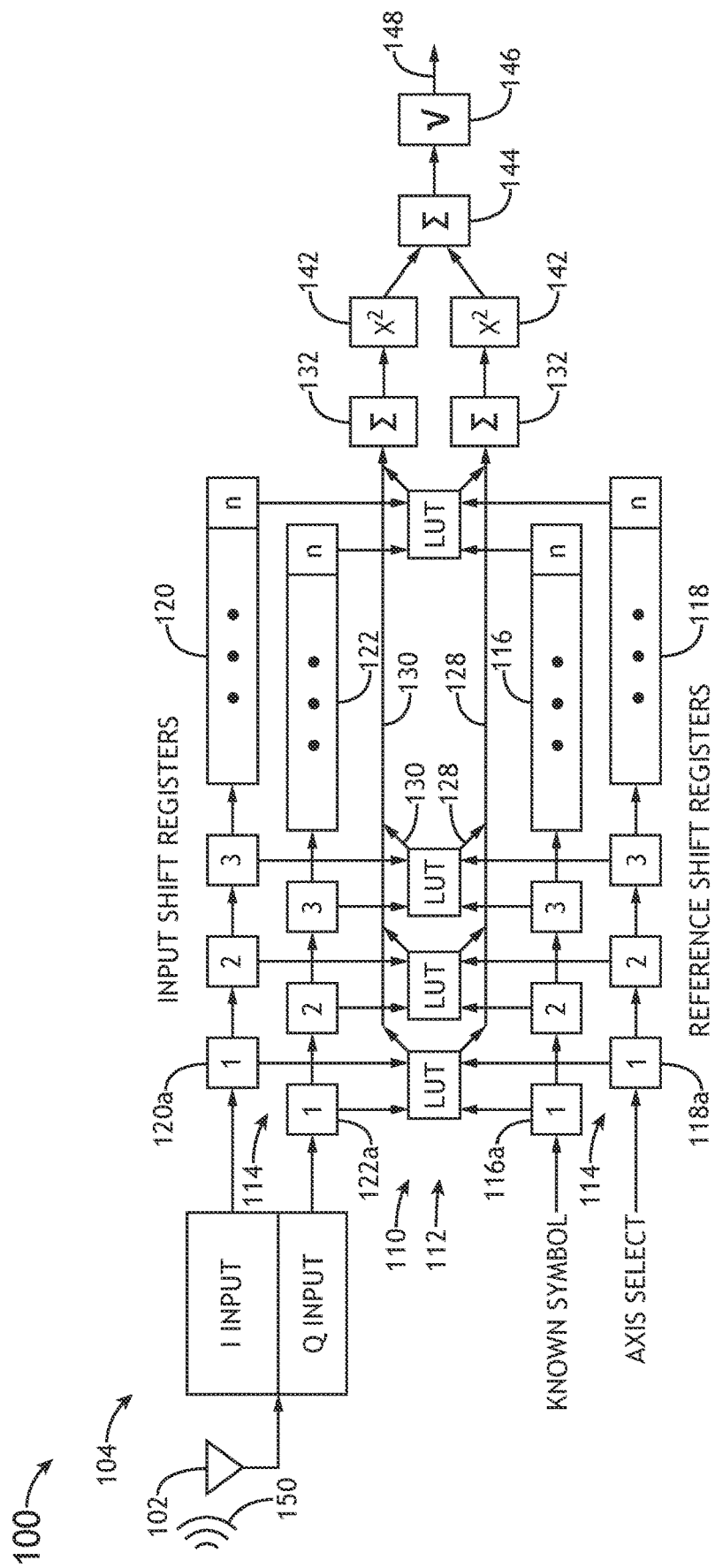
FIG. 2 is a conceptual block diagram of a system for correlating a received signal which includes FPGA look-up tables (LUTs), in accordance with one or more embodiments of the present disclosure.

In at least some embodiments, it is contemplated herein, that the entirety of FIG. 1B may be able to be simplified to a binary configuration consisting of a single LUT 112 of FIG. 2.

FIG. 2 illustrates a conceptual block diagram of a system 100 for correlating a received signal which includes FPGA look-up tables (LUTs) 112, in accordance with one or more embodiments of the present disclosure.

As shown in FIG. 2, LUTs 112 creating basic correlator elements can be readily assembled into larger correlator structures, thereby allowing the formation of very large efficient correlators consuming relatively small amounts of power.

As shown in FIG. 2, system 100 may include an antenna 102 configured to receive a received signal 150 (e.g., radio frequency (RF) signal). The system 100 includes a controller 104. The controller 104 may include a field programmable gate array (FPGA) 110. The FPGA 110 may include a plurality of look-up tables (LUTs) 112. The controller 104 may further include a plurality of registers 114 for storing and manipulating data. The plurality of registers 114 may be coupled, electrically and communicatively, to the plurality of LUTs 112. The plurality of registers 114 may include a known reference register 116 configured to store known binary values of a known reference sequence, a secondary reference register 118 configured to store secondary reference values, an in-phase register 120 configured to store in-phase binary values of the received signal, and a quadrature register 122 configured to store quadrature binary values of the received signal. Each LUT 112 may be configured to receive Boolean inputs from the known reference register 116, the secondary reference register 118, the in-phase register 120, and the quadrature register 122 and output correlation results based on the Boolean inputs.

In embodiments, each LUT 112 is configured to act as an elemental quadrature correlator. For example, acting as an "elemental quadrature correlator" may mean provide output values as shown in FIG. 3 based on the input values shown in FIG. 3.

Each operation of each elemental quadrature correlator may determine an (elemental) correlation between a Boolean bit of a known reference symbol sequence and a Boolean bit of a received signal 150 having an arbitrary signal rotation. Many such elemental correlations (e.g., correlation results 128, 130) may be combined to determine an overall correlation result 148 using any method or system configuration provided herein and/or known in the art. For example, as shown in FIG. 2, correlation results 128, 130 for each orientation may be respectively summed (using an adder arrangement (or operation) 132), and squared (using a squaring element (or operation) 142). Then each of those respective values summed together using another adder element (or operation) 144, and an optional square root determined using a square root element (or operation) 146 to achieve the overall correlation result 148 of a received signal 150.

In embodiments, the secondary reference register 118 may include an axis selector register, and the secondary reference values may be axis selection values.

In embodiments, the secondary reference register 118 may include a secondary known reference register configured to store secondary known binary values of a secondary known reference sequence. For example, Quadrature Phase-Shift Keying (QPSK) modulation, which uses binary symbols in simultaneous pairs can be handled with little more than changing the Axis Select input to instead function as another known symbol input so that the elemental LUT correlator receives the known symbols in pairs.

Each correlation result of each LUT 112 may include two values, a first correlation result 128 and a second correlation result 130, configured to be output at two respective outputs of each LUT 112. The LUT 112 may be configured to output the first correlation result 128 to be indicative of an alignment of the received signal with a 0-degree (and/or 180 degree) rotation. The LUT 112 may be configured to output the second correlation result 130 to be indicative of an (alternate) alignment of the received signal with a 90-degree (and/or 270 degree) rotation.

For example, a (first) known reference register Boolean value 116a (e.g., a 0 or 1 value); a (first) secondary reference register Boolean value 118a; a (first) in-phase register Boolean value 120a; and a (first) axis selector register Boolean value 122a may be input into the LUT 112. The LUT 112, based on these Boolean inputs, may be configured to output a first correlation result 128 and a second correlation result 130.

In at least some (if not all) embodiments, given that the Known Symbol 116a is binary but positioned in quadrature, it is not necessary for the receiver's IQ baseband signal to retain amplitude. Hence, a simple binary determination in each axis may be sufficient. Thus, functionality for a portion of circuits illustrated by FIG. 1B and FIG. 2 can be as described in Table 1 as follows:

TABLE 1

| Quadrature Correlator | | | | | |
|---|---|---|---|---|---|
| Inputs | | | | Out | |
| KS | AS | I | Q | 0 | 90 |
| 1 | 1 | 1 | 1 | −1 | 1 |
| 1 | 1 | 1 | −1 | 1 | 1 |
| 1 | 1 | −1 | 1 | −1 | −1 |
| 1 | 1 | −1 | −1 | 1 | −1 |
| 1 | −1 | 1 | 1 | 1 | 1 |
| 1 | −1 | 1 | −1 | 1 | −1 |
| 1 | −1 | −1 | 1 | −1 | 1 |
| 1 | −1 | −1 | −1 | −1 | −1 |
| −1 | 1 | 1 | 1 | 1 | −1 |
| −1 | 1 | 1 | −1 | −1 | −1 |
| −1 | 1 | −1 | 1 | 1 | 1 |
| −1 | 1 | −1 | −1 | −1 | 1 |
| −1 | −1 | 1 | 1 | −1 | −1 |
| −1 | −1 | 1 | −1 | −1 | 1 |
| −1 | −1 | −1 | 1 | 1 | −1 |
| −1 | −1 | −1 | −1 | 1 | 1 |

It can be seen in Table 1 that all inputs and outputs are binary, either +1 or −1. This binary nature allows the table to be reduced to a Boolean look-up table representation, as shown in FIG. 3.

FIG. 3 illustrates a table 300 of Boolean correlator LUT input and output values, in accordance with one or more embodiments of the present disclosure. The table 300 illustrates the correlation results 128, 130 based on the Boolean inputs from the known reference register 116, the secondary reference register 118, the in-phase register 120, and the quadrature register 122.

In embodiments, the LUT 112 is configured (e.g., programmed) to act as an elemental quadrature correlator. For example, the LUT 112 may be configured to output the correlation results 128, 130 as shown in FIG. 3.

The LUT 112 may be configured, for example, to output a specific set of Boolean correlation results 128, 130 based on a specific set of Boolean inputs 116, 118, 120, 122, such as shown by any row (e.g., row 302) in FIG. 3. For example, one or more of the rows shown may be indicative of a LUT 112 configured to act as an elemental quadrature correlator. For instance, as shown in row 302, for a known binary value (e.g., Known Symbol value) 116 of 1, a secondary reference value (e.g., axis select value) 118 of 0, an in-phase binary value 120 of 1, and a quadrature binary value 122 of 1, the LUT 112 may be configured (e.g., programmed) to output a first correlation result 128 of 1, and a second correlation result 130 of 1.

In embodiments, referring back to FIG. 2, the controller 104 may be configured to determine an overall orientation and alignment of the received signal 150 based on the correlation results, indicating the rotation angle of the received signal 150. This can be done by comparing the correlation results against a threshold or multiple thresholds.

The received signal 150 may be a radio frequency (RF) signal.

In embodiments, various LUTs 112 may be used. For example, LUTs 112 that include, but are not necessarily limited to, five (Boolean) inputs and two (Boolean) outputs may be used. Needing only four inputs and two outputs for the elemental quadrature correlator of FIG. 2, a single LUT 112 can support this concept for an elemental quadrature correlator.

The controller 104 may further include an adder arrangement 132 comprising adder LUTs, where each adder LUT is coupled to two LUTs 112. Such pair-wise adding of outputs may be performed as an add-accumulate operation.

Because the output of the elemental correlator is Boolean, a minor translation may be needed to achieve an integer representation for all possible outputs, as offered in the following Table 2:

TABLE 2

| 1st Add--Accumulate | | |
| --- | --- | --- |
| 2n − 1 | 2n | Out |
| −1 | −1 | −2 |
| −1 | 1 | 0 |
| 1 | −1 | 0 |
| 1 | 1 | 2 |

Table 2 may be further reduced to a Boolean-input, integer-output version. There are only three output states in Table 2, thus, making it suitable for direct implementation within a single LUT 112 using the two outputs (i.e., two bits) provided by that LUT (i.e., the two bits offer up to four states). This reduced implementation is offered in Table 3 as follows:

TABLE 3

| Boolean | | Integer |
| --- | --- | --- |
| 2n − 1 | 2n | Out |
| 0 | 0 | −1 |
| 0 | 1 | 0 |
| 1 | 0 | 0 |
| 1 | 1 | 1 |

A conventional adder arrangement can be used to complete the correlator—with the lower elements in the adder hierarchy using adder LUTs as just described and higher elements, in some embodiments, benefitting from Digital Signal Processing (DSP) processing elements. For example, as shown in FIG. 2, the adder arrangement 132 may include pairwise (i.e., 2n−1 and 2n) additions of two LUT outputs, one from each LUT 112 using adder LUTs. This may reduce the number of, for example, first correlation results 128 in half, by adding them in pairs. Next, DSP processing elements may be used to add the remaining numbers into one overall summation of first correlation results 128. DSP may be used for the overall summation because two-bit LUTs would not have the range of bits needed to represent higher numbers when adding many numbers. Using adder LUTs for the first round of additions may reduce the number of computations needed by the DSP elements, improving efficiency. Further, since the elemental correlator itself comprises a LUT 112, then LUTs may be used for both correlation and addition.

Using the elemental correlator LUT described here, overall construction for a complete correlator structure capable of handling Minimum Shift Keying (MSK), Gaussian Minimum Shift Keying (GMSK), Offset Quadrature Phase-Shift Keying (OQPSK), Continuous Phase Modulation (CPM), and even Binary Phase-Shift Keying (BPSK) very efficiently becomes possible.

Due to being in quadrature, the input and output structures shown in FIG. 2 are obviously twice the size of those in the binary correlator of FIG. 1A. The element at the heart of either type of correlator implementation though may be a single look-up table (LUT).

In embodiments, in addition to MSK, GMSK, OQPSK, CPM, and BPSK, nearly all quadrature phase modulations may be efficiently handled with the elemental correlator LUT 112 described herein, albeit with minor variations perhaps in the structure surrounding the LUT.

In sum, the system 100 offers a novel solution for correlating a received signal 150 using FPGA LUTs 112, thereby simplifying the overall computational load and improving efficiency. This system 100 could be implemented in numerous applications that require signal correlation, such as in telecommunications, radar systems, and wireless communication devices.

Figure 4:
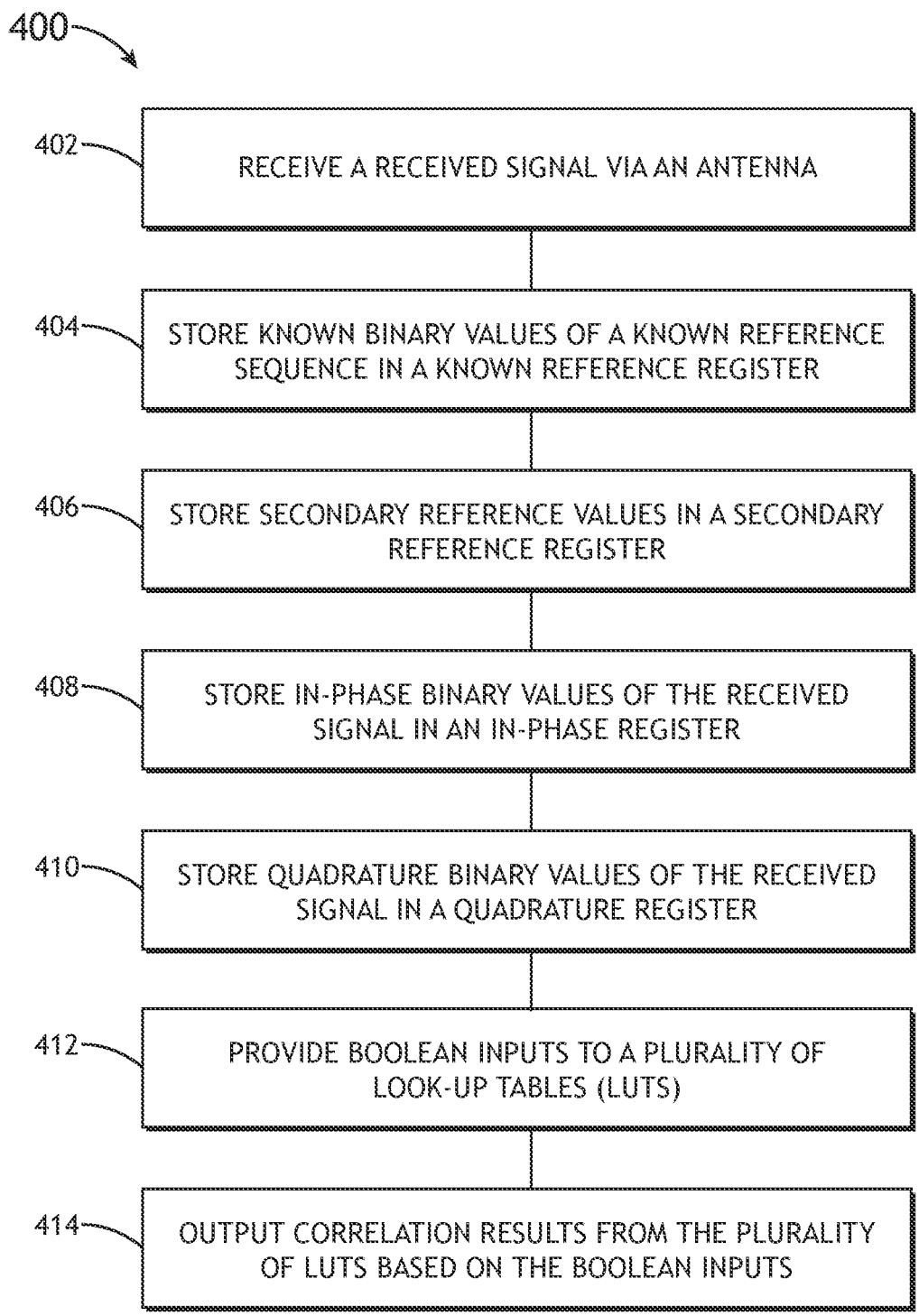
FIG. 4 is a block diagram illustrating a method for correlating a received signal, in accordance with one or more embodiments of the disclosure.

FIG. 4 is a block diagram illustrating a method 400 for correlating a received signal, in accordance with one or more embodiments of the disclosure.

In embodiments, the method 400 includes a step 402 of receiving a received signal 150 via an antenna 102. For example, the received signal may be a radio frequency signal or any other type of signal that requires correlation.

In some embodiments, the method 400 may further include a step 404 of storing known binary values of a known reference sequence in a known reference register 116. The known reference sequence may be a predefined sequence that is used for comparison with the received signal.

In some embodiments, the method 400 may further include a step 406 of storing secondary reference values in a secondary reference register 118. For example, the secondary reference values may be axis select values used in the LUT 112 to determine which axis of orientation is being compared to.

In some embodiments, the method 400 may further include a step 408 of storing in-phase binary values of the received signal in an in-phase register 120.

In some embodiments, the method 400 may further include a step 410 of storing quadrature binary values of the received signal in a quadrature register 122. The quadrature binary values may represent the quadrature component of the received signal.

In some embodiments, the method 400 may further include a step 412 of providing Boolean inputs from the known reference register 116, the secondary reference register 118, the in-phase register 120, and the quadrature register 122 to a plurality of look-up tables (LUTs) 112 of an FPGA 110. The Boolean inputs may be used by the LUTs, to output corresponding output values associated with those finite number of input values, as look-up tables are configured to do.

In some embodiments, the method 400 may further include a step 414 of outputting correlation results from the plurality of LUTs 112 based on the Boolean inputs. The correlation results may indicate the correlation between the received signal and the known reference sequence.

The one or more processors of controller 104 may include any one or more processing elements known in the art. In this sense, the one or more processors may include any microprocessor device configured to execute algorithms and/or instructions. In one embodiment, the one or more processors may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium may include any storage medium known in the art suitable for storing program instructions executable by the associated one or more processors. For example, the memory medium may include a non-transitory memory medium. For instance, the memory medium may include, but is not limited to, a read-only memory, a random-access memory, a magnetic or optical memory device (e.g., disk), a magnetic tape, a solid state drive and the like. In another embodiment, it is noted herein that the memory is configured to store one or more results from the system 100 and/or the output of the various steps described herein. It is further noted that memory may be housed in a common controller housing with the one or more processors. In an alternative embodiment, the memory may be located remotely with respect to the physical location of the processors and controller 104. For instance, the one or more processors of controller 104 may access a remote memory (e.g., server), accessible through a network (e.g., internet, intranet and the like). In another embodiment, the memory medium stores the program instructions for causing the one or more processors to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 104 of the system 100 may be configured to receive and/or acquire data or information from other systems by a transmission medium that may include wireline and/or wireless portions. In another embodiment, the controller 104 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 104 and other subsystems of the system 100. Moreover, the controller 104 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for correlating a received signal, the system comprising;
    an antenna configured to receive the received signal;
    a controller comprising:
        a field programmable gate array (FPGA) comprising a plurality of look-up tables (LUTs);
        a plurality of registers for storing and manipulating data, the plurality of registers coupled to the plurality of LUTs and comprising:
            a known reference register configured to store known binary values of a known reference sequence;
            a secondary reference register configured to store secondary reference values;
            an in-phase register configured to store in-phase binary values of the received signal; and
            a quadrature register configured to store quadrature binary values of the received signal,
        wherein each LUT is configured to receive Boolean inputs from the known reference register, the secondary reference register, the in-phase register, and the quadrature register and to output correlation results based on the Boolean inputs.

2. The system of claim 1, wherein each LUT is configured to act as an elemental quadrature correlator.

3. The system of claim 1, wherein the secondary reference register comprises an axis selector register, and wherein the secondary reference values comprise axis selection values.

4. The system of claim 1, wherein the secondary reference register comprises a secondary known reference register and wherein the secondary reference values comprise secondary known binary values of a secondary known reference sequence.

5. The system of claim 1, wherein each correlation result of each LUT comprises two values, a first correlation result and a second correlation result, configured to be output at two respective outputs of each LUT.

6. The system of claim 5, wherein the first correlation result is indicative of an alignment of the received signal with a 0-degree rotation, and wherein the second correlation result is indicative of an alternate alignment of the received signal with a 90-degree rotation.

7. The system of claim 5, wherein the controller further comprises an adder arrangement comprising adder LUTs, wherein each adder LUT is coupled to two LUTs.

8. The system of claim 1, wherein the controller is further configured to determine an overall orientation and an overall alignment of the received signal based on the correlation results.

9. The system of claim 1, wherein the received signal is a radio frequency signal.

10. A method for correlating a received signal, the method comprising the steps of:
    receiving the received signal via an antenna;
    storing known binary values of a known reference sequence in a known reference register;
    storing secondary reference values in a secondary reference register;
    storing in-phase binary values of the received signal in an in-phase register;
    storing quadrature binary values of the received signal in a quadrature register;
    providing Boolean inputs from the known reference register, the secondary reference register, the in-phase register, and the quadrature register to a plurality of look-up tables (LUTs) of a field programmable gate array (FPGA); and
    outputting correlation results from the plurality of LUTs based on the Boolean inputs.

11. The method of claim 10, wherein each LUT acts as an elemental quadrature correlator.

12. The method of claim 10, wherein the secondary reference register comprises an axis selector register, and wherein the secondary reference values comprise axis selection values.

13. The method of claim 10, wherein the secondary reference register comprises a secondary known reference register, and wherein the secondary reference values comprise secondary known binary values of a secondary known reference sequence.

14. The method of claim 10, wherein each correlation result of each LUT comprises two values, a first correlation result and a second correlation result, output at two respective outputs of each LUT.

15. The method of claim 14, wherein the first correlation result is indicative of an alignment of the received signal with a 0-degree rotation, and the second correlation result is indicative of an alternate alignment of the received signal with a 90-degree rotation.

16. The method of claim 14, further comprising adding the first and second correlation results using an adder arrangement comprising adder LUTs, wherein each adder LUT is coupled to two LUTs.

17. The method of claim 10, further comprising determining an overall orientation and an overall alignment of the received signal based on the correlation results.

18. The method of claim 10, wherein the received signal is a radio frequency signal.

19. A look-up table (LUT) for use in a system for correlating a received signal, the LUT comprising:
    inputs configured to:
        receive Boolean inputs from:
            a known reference register;
            a secondary reference register;
            an in-phase register; and
            a quadrature register; and
    two outputs configured to:

output correlation results based on the Boolean inputs, wherein each correlation result comprises two values indicative of an alignment of the received signal with a respective rotation.

20. The LUT of claim 19, wherein the LUT is configured to act as an elemental quadrature correlator.

* * * * *